United States Patent [19]
Turnquist et al.

[11] Patent Number: 5,975,537
[45] Date of Patent: Nov. 2, 1999

[54] ROTOR AND STATOR ASSEMBLY CONFIGURED AS AN ASPIRATING FACE SEAL

[75] Inventors: Norman Arnold Turnquist, Cobleskill; Bharat Sampathkumaran Bagepalli, Niskayuna; George Reluzco, Schenectady, all of N.Y.; Wu-Yang Tseng, West Chester, Ohio

[73] Assignee: General Electric Company, Schenectady, N.Y.

[21] Appl. No.: 08/958,245

[22] Filed: Oct. 27, 1997

Related U.S. Application Data

[60] Provisional application No. 60/051,500, Jul. 1, 1997.

[51] Int. Cl.$^6$ ........................................................ F16J 15/44
[52] U.S. Cl. ................................................ 277/411; 277/412
[58] Field of Search ................................... 277/409, 411, 277/412, 418, 927, 413, 305; 415/111, 115, 174.5; 384/100, 114, 120, 901

[56] References Cited

U.S. PATENT DOCUMENTS

| | | | |
|---|---|---|---|
| 2,598,176 | 5/1952 | Johnstone | 277/411 X |
| 3,273,899 | 9/1966 | Warnery | 277/411 |
| 3,291,447 | 12/1966 | Brandon | 415/111 |
| 3,516,757 | 6/1970 | Baumann | 415/111 |
| 5,284,347 | 2/1994 | Pope | 277/305 |

OTHER PUBLICATIONS

H.F. Hwang et al., AIAA–95–2618, "Advanced Seals for Engine Secondary Flow Path," 31st AIAA/ASME/SAE/ASEE Joint Propulsion Conference and Exhibit, Jul. 10–12, 1995, San Diego, CA.

C.E. Wolfe et al., AIAA–96–2802, "Full Scale Testing and Analytical Validation of an Aspirating Face Seal," 32nd AIAA/ASME/SAE/ASEE Joint Propulsion Conference and Exhibit, Jul. 1–3, 1996, Lake Buena Vista, FL.

B.S. Bagepalli et al., AIAA–96–2803, "Dynamic Analysis of an Aspirating Face Seal for Aircraft–Engine Application," 32nd AIAA/ASME/SAE/ASEE Joint Propulsion Conference and Exhibit, Jul. 1–3, 1996, Lake Buena Vista, FL.

*Primary Examiner*—Lynne Reichard
*Assistant Examiner*—Greg Binda
*Attorney, Agent, or Firm*—Douglas E. Erickson; Marvin Snyder

[57] ABSTRACT

A rotor and stator assembly having a rotor and a stator with opposing surfaces defining an air bearing and an air dam of an aspirating face seal. In a first embodiment, the air bearing and the air dam are axially offset. In a second embodiment, the rotor has an axially extending protuberance located radially between the air bearing and the air dam. The axial offset and the protuberance each act to divert the air flow (e.g., compressed gas or combustion gases in a gas turbine or steam in a steam turbine) in a direction transverse to the air flow direction through the air bearing and the air dam, thus isolating the air flows from the air bearing and the air dam which improves seal performance.

19 Claims, 2 Drawing Sheets

ROTOR AND STATOR ASSEMBLY CONFIGURED AS AN ASPIRATING FACE SEAL

This application claims priority of a Provisional Application entitled "Aspirating Face Seal With Improved Air Dam And Air Bearing Flow Isolation" by Norman A. Turnquist et al., Ser. No. 60/051,500 filed Jul. 1, 1997.

The Government has certain rights to this invention pursuant to NASA contract number NAS3-26617.

FIELD OF THE INVENTION

The present invention relates generally to aspirating face seals, and more particularly to a rotor and stator assembly configured as an aspirating face seal.

BACKGROUND OF THE INVENTION

Aspirating face seals are used to minimize leakage through a gap between two components, wherein such leakage is from a higher pressure area to a lower pressure area. Such seals have been used, or their use proposed, in rotating machinery. Such use includes, but is not limited to, turbomachinery including steam turbines and gas turbines used for power generation and gas turbines used for aircraft and marine propulsion. It is noted that aspirating face seals minimize the leakage of steam between a rotor and a stator in steam turbines and minimize the leakage of compressed air or combustion gases between a rotor and a stator in gas turbines.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the low-pressure-turbine thrust-bearing area of a gas turbine, between axially opposing areas of a rotating cone of the rotor and an inner casing of the stator, will lower the efficiency of the gas turbine leading to increased fuel costs. Also, steam-path leakage in the turbine area of a steam turbine, between axially opposing portions of the rotor and stator, will lower the efficiency of the steam turbine leading to increased fuel costs.

Conventional aspirating face seals typically have the rotor configured as a first seal part, with the first seal part either being attached to, or being a monolithic portion of, the rotor. Likewise, such seals typically have the stator configured as a second seal part, with the second seal part either being attached to, or being a monolithic portion of, the stator. The first and second seal parts are generally annular, generally perpendicular to the longitudinal axis of the rotor, generally opposing, axially spaced apart, and proximate each other. Typically, the first part and the second part together define a radially extending air bearing and a radially extending air dam positioned radially inward of the air bearing. The air bearing surface of the first part and the air dam surface of the first part generally lie in the same plane. The air bearing surface of the second part has a hole which is an outlet for a first passageway connecting the hole with air from the higher pressure side of the seal. The stator has a second passageway which carries air, which has passed the air dam from the higher pressure side of the seal, to the lower pressure side of the seal. Known seal designs have also included an aspirator tooth extending from the stator axially across, and radially inward of, the air dam, with the aspirator tooth having a tip spaced apart from and proximate the rotor.

It is important to note that an aspirating face seal is a non-contacting seal in that the first and second parts of the seal do not touch. It is also important to note that aspirating face seal technology uses phrases such as "air bearing", "air dam", and "air flow", wherein it is understood that the word "air" is used to describe the working fluid of the seal. The working fluid of an aspirating face seal includes, without limitation, compressed air, combustion gases, and steam.

Applicants found that although mathematical modeling of an aspirating face seal predicted good seal performance with a small controlled leakage, a full scale test of such a seal, in an aircraft-engine gas-turbine configuration, yielded poor seal performance with a large controlled leakage. What is needed is an aspirating face seal capable of being used in a rotor and stator assembly, such as a rotor and stator assembly of a gas-turbine aircraft engine, with a small controlled leakage.

SUMMARY OF THE INVENTION

Broadly described, the rotor and stator assembly of the present invention includes a rotor, a stator, and a device for diverting air flow. The rotor has a generally longitudinally extending axis, a first air bearing surface, and a first air dam surface. The first air bearing surface is generally annular and generally perpendicular to the axis. The first air dam surface is generally annular and generally perpendicular to the axis. The stator has a second air bearing surface and a second air dam surface. The second air bearing surface is generally annular, generally perpendicular to the axis, and spaced apart from and proximate the first air bearing surface. The second air dam surface is generally annular, generally perpendicular to the axis, and spaced apart from and proximate the first air dam surface. The first and second air bearing surfaces generally oppose each other and define an air bearing of an aspirating face seal, and the first and second air dam surfaces generally oppose each other and define an air dam of the aspirating face seal. In an above-axis longitudinal cross-sectional view, the air bearing has a first air flow direction and the air dam has a second air flow direction which is generally parallel to the first air flow direction. The device for diverting air flow is a device for diverting, in a direction transverse to the first air flow direction, any air flow between the air bearing and the air dam.

In a first preferred embodiment, the rotor and stator assembly of the present invention includes a rotor and a stator. The rotor has a generally longitudinally extending axis, a first air bearing surface, and a first air dam surface. The first air bearing surface is generally annular, generally perpendicular to the axis, and generally planar. The first air dam surface is generally annular, generally perpendicular to the axis, generally planar, and radially proximate and axially offset from the first air bearing surface. The stator has a second air bearing surface and a second air dam surface. The second air bearing surface is generally annular, generally perpendicular to the axis, generally planar, and spaced apart from and proximate the first air bearing surface. The second air dam surface is generally annular, generally perpendicular to the axis, generally planar, radially proximate and axially offset from the second air bearing, and spaced apart from and proximate the first air dam surface. The first and second air bearing surfaces generally oppose each other and define an air bearing of an aspirating face seal, and the first and second air dam surfaces generally oppose each other and define an air dam of the aspirating face seal.

In a second preferred embodiment, the rotor and stator assembly of the present invention includes a rotor and a stator. The rotor has a generally longitudinally extending axis, a first air bearing surface, a first air dam surface, and a protuberance. The first air bearing surface is generally annular, generally perpendicular to the axis, and generally planar. The first air dam surface is generally annular, generally perpendicular to the axis, and generally planar. The protuberance is disposed radially between, and extends axially above, the first air bearing surface and the first air dam surface. The stator has a second air bearing surface and a second air dam surface. The second air bearing surface is generally annular, generally perpendicular to the axis, generally planar, and spaced apart from and proximate the first air bearing surface. The second air dam surface is generally annular, generally perpendicular to the axis, generally planar, and spaced apart from and proximate the first air dam surface. The first and second air bearing surfaces generally oppose each other and define an air bearing of an aspirating face seal, and the first and second air dam surfaces generally oppose each other and define an air dam of the aspirating face seal.

Several benefits and advantages are derived from the invention. The broadly-described device for diverting air flow diverts, in a direction transverse to the air flow direction through the air dam and the air bearing (as seen in an above-axis longitudinal cross-sectional view), any air flow between the air bearing and the air dam. The axially-offset air dam of the first preferred embodiment and the protuberance of the second preferred embodiment divert, in an axial direction, any radial air flow between the air bearing and the air dam. Such device, such axially-offset air dam, and such protuberance each serve to isolate the air dam flow and the air bearing flow from each other. The flow from the air dam region is inhibited from interfering with the hydrostatic air bearing flow, permitting improved seal performance.

DETAILED DESCRIPTION OF THE INVENTION

Figure 1:
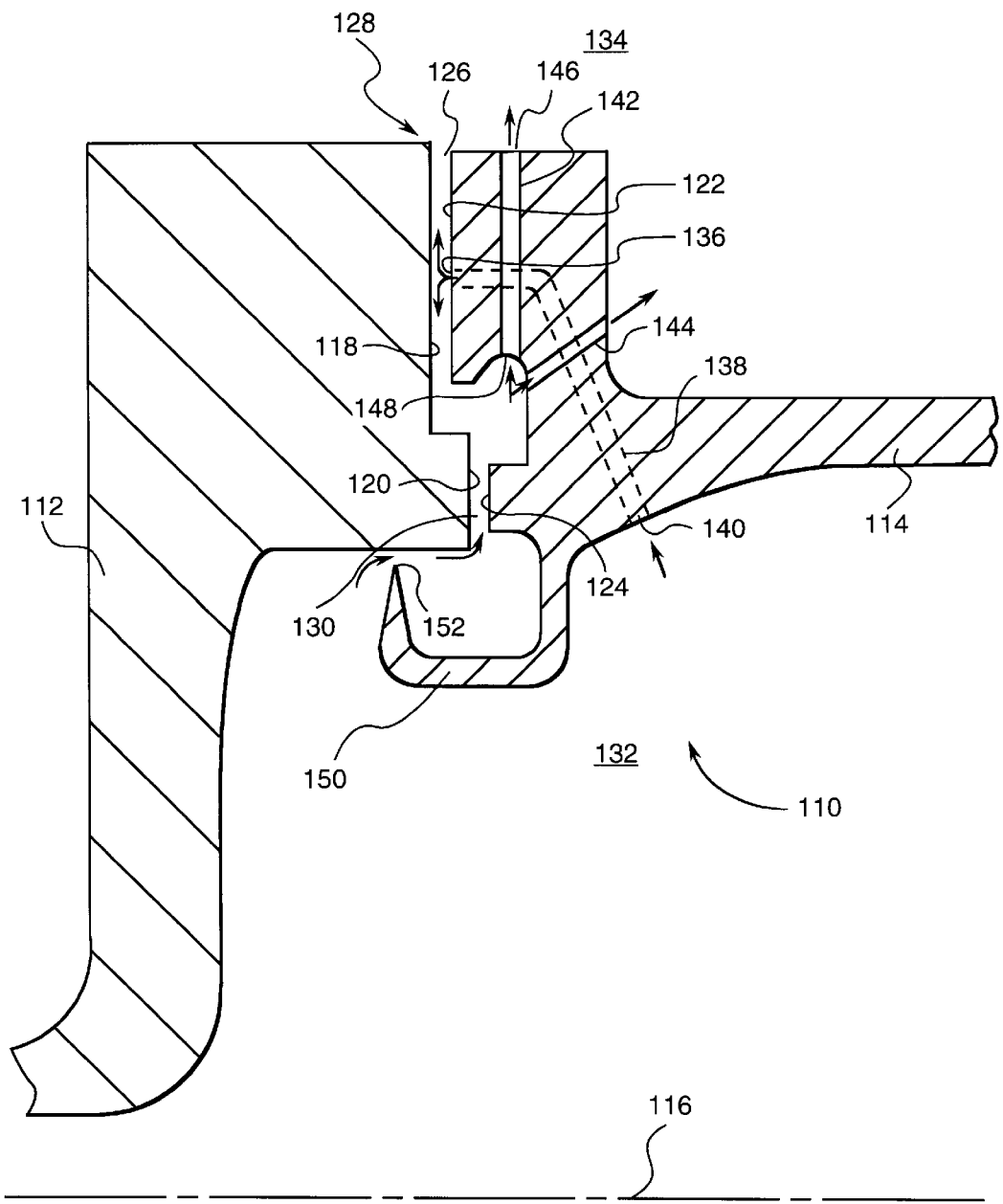
FIG. 1 is a schematic, above-axis longitudinal cross-sectional view of a first preferred embodiment of the rotor and stator assembly of the present invention showing an aspirating face seal having an axially-offset air dam.

Referring now to the drawings, wherein unnumbered arrows indicate the direction of air flow, FIG. 1 schematically shows a first preferred embodiment of the rotor and stator assembly 110 of the present invention. Preferably, the rotor and stator assembly 110 define part of a gas turbine used for aircraft and marine propulsion or define part of a gas turbine or steam turbine used for power generation. In describing the invention, terms of art used to describe aspirating face seals will be used such as "air bearing", "air dam" and "air flow". As is understood by those skilled in the art, the word "air" used in these terms includes "steam" in the case of steam turbines and includes "compressed air" and/or "combustion gases" in the case of gas turbines.

The rotor and stator assembly 110 includes a rotor 112 and a stator 114. The rotor 112 (only a portion of which is shown in FIG. 1) has a generally longitudinally extending axis 116, a first air bearing surface 118, and a first air dam surface 120.

The first air bearing surface 118 is generally annular, generally perpendicular to the axis 116, and preferably generally planar. The first air dam surface 120 is generally annular, generally perpendicular to the axis 116, preferably generally planar, and radially proximate and axially offset from the first air bearing surface 118. It is noted that only an above-axis longitudinal cross-sectional view of the rotor 112 is shown in FIG. 1. The terminology "longitudinal cross-sectional" means a cross section cut by a plane which wholly contains the longitudinal axis 116. The first air bearing and air dam surfaces 118 and 120 may be a monolithic portion of the rotor 112 or may be portions of components attached directly or indirectly to the rotor 112. In either case, the rotor 112 is considered to have such surfaces 118 and 120.

The stator 114 (only a portion of which is shown in FIG. 1) has a second air bearing surface 122 and a second air dam surface 124. The second air bearing surface 122 is generally annular, generally perpendicular to the axis 116, preferably generally planar, and spaced apart from and proximate the first air bearing surface 118. The second air dam surface 124 is generally annular, generally perpendicular to the axis 116, preferably generally planar, radially proximate and axially offset from the second air bearing 122, and spaced apart from and proximate the first air dam surface 120. The first and second air bearing surfaces 118 and 122 generally oppose each other and define an air bearing 126 of an aspirating face seal 128. The first and second air dam surfaces 120 and 124 generally oppose each other and define an air dam 130 of the aspirating face seal 128. It is noted that when the surfaces 118, 120, 122, and 124 are planar, both the air bearing 126 and the air dam 130 are generally radially extending. In the broadest sense, such surfaces 118, 120, 122, and 124 of the present invention could be non-planar, such as being cone shaped, as can be appreciated by the artisan. The second air bearing and air dam surfaces 122 and 124 may be a monolithic portion of the stator 114 or may be portions of components attached directly or indirectly to the stator 114. In either case, the stator 114 is considered to have such surfaces 122 and 124.

In an exemplary construction, the first air bearing surface 118 is radially adjacent the first air dam surface 120, and the first air bearing surface 118 extends closer to the axis 116 than does the second air bearing surface 122. It is preferred that the air bearing 126 is disposed radially outward of the air dam 130, and that the first air dam surface 120 axially protrude above the first air bearing surface 118. Preferably, ambient air 132 proximate and radially inward of the air dam 130 has a higher static pressure, and ambient air 134 proximate and radially outward of the air bearing 126 has a lower static pressure.

The second air bearing surface 122 has a surface hole 136, and the stator 114 has a first passageway 138 (shown in dashed line in FIG. 1). The first passageway 138 has a first outlet orifice which is defined by the surface hole 136 and has a first inlet orifice 140 which is in fluid communication with the ambient air 132 having the higher static pressure. The stator 114 has a second passageway 142 and preferably a third passageway 144 which is similar to the second passageway 142. The second passageway 142 has a second outlet orifice 146 which is in fluid communication with the ambient air 134 having the lower static pressure and has a second inlet orifice 148 which is in fluid communication with the ambient air 132 having the higher static pressure which has passed through the air dam 130. In a preferred construction, the stator 114 also has an aspirator tooth 150 extending axially across and radially inward of the air dam 130, wherein the aspirator tooth 150 has a tip 152 spaced apart from and proximate the rotor 112.

Figure 2:
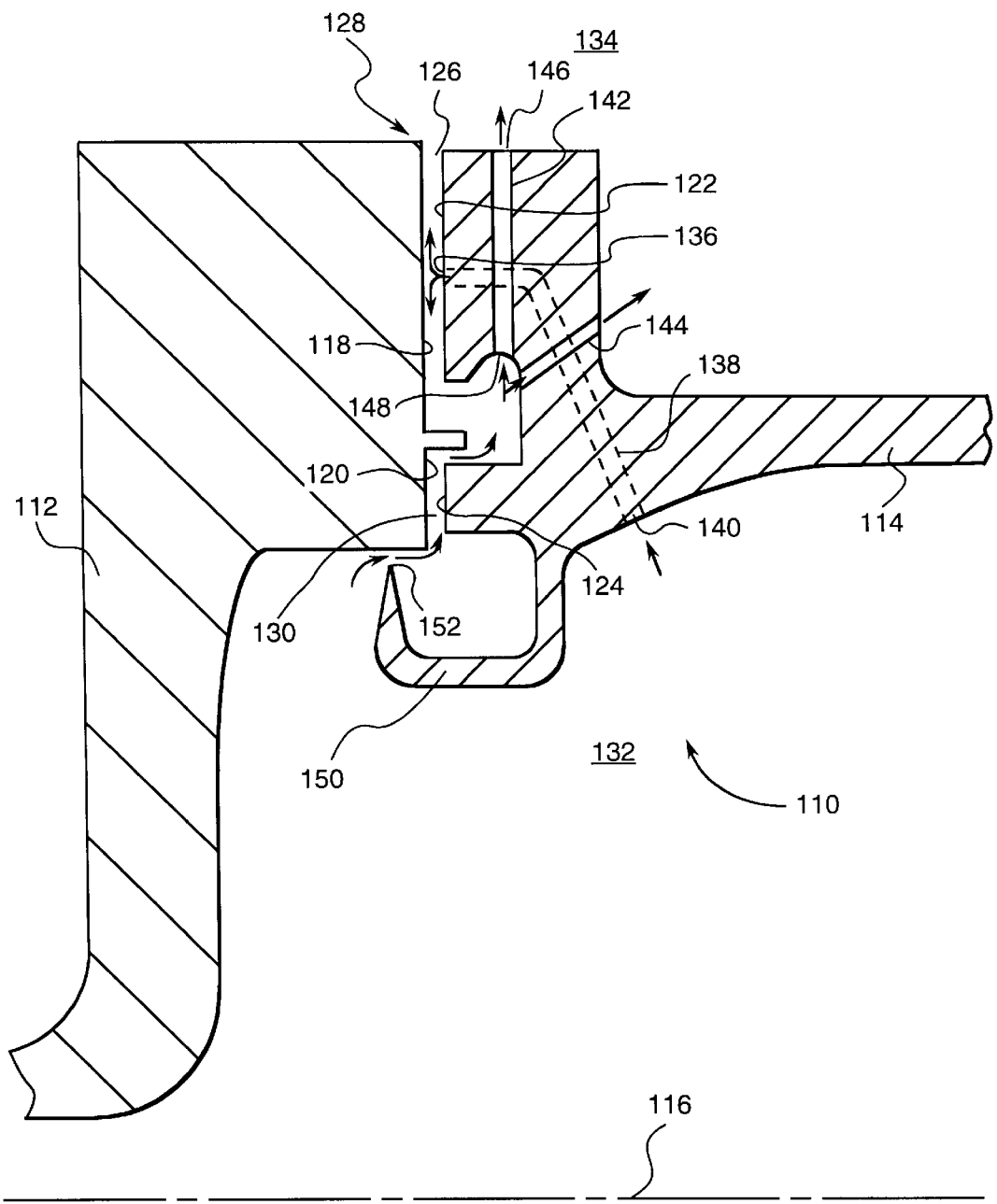
FIG. 2 is a view, as in FIG. 1, but of a second preferred embodiment of the rotor and stator assembly of the present invention showing an aspirating face seal having a protuberance.

Referring again to the drawings, wherein unnumbered arrows indicate the direction of air flow, FIG. 2 schematically shows a second preferred embodiment of the rotor and stator assembly 210 of the present invention. Preferably, the rotor and stator assembly 210 define part of a gas turbine used for aircraft and marine propulsion or define part of a gas turbine or steam turbine used for power generation. In describing the invention, terms of art used to describe aspirating face seals will be used such as "air bearing", "air dam" and "air flow". As is understood by those skilled in the art, the word "air" used in these terms includes "steam" in the case of steam turbines and includes "compressed air" and/or "combustion gases" in the case of gas turbines.

The rotor and stator assembly 210 includes a rotor 212 and a stator 214. The rotor 212 (only a portion of which is shown in FIG. 2) has a generally longitudinally extending axis 216, a first air bearing surface 218, a first air dam surface 220, and a protuberance 221. The first air bearing surface 218 is generally annular, generally perpendicular to the axis 216, and preferably generally planar. The first air dam surface 220 is generally annular, generally perpendicular to the axis 216, and preferably generally planar. The protuberance 221 is disposed radially between, and extends axially above, the first air bearing surface 218 and the first air dam surface 220. It is noted that only an above-axis longitudinal cross-sectional view of the rotor 212 is shown in FIG. 2. The terminology "longitudinal cross-sectional" means a cross section cut by a plane which wholly contains the longitudinal axis 216. The first air bearing and air dam surfaces 218 and 220 may be a monolithic portion of the rotor 212 or may be portions of components attached directly or indirectly to the rotor 212. In either case, the rotor 212 is considered to have such surfaces 218 and 220.

The stator 214 (only a portion of which is shown in FIG. 2) has a second air bearing surface 222 and a second air dam surface 224. The second air bearing surface 222 is generally annular, generally perpendicular to the axis 216, preferably generally planar, and spaced apart from and proximate the first air bearing surface 218. The second air dam surface 224 is generally annular, generally perpendicular to the axis 216, preferably generally planar, and spaced apart from and proximate the first air dam surface 220. The first and second air bearing surfaces 218 and 222 generally oppose each other and define an air bearing 226 of an aspirating face seal 228. The first and second air dam surfaces 220 and 224 generally oppose each other and define an air dam 230 of the aspirating face seal 228. It is noted that when the surfaces 218, 220, 222, and 224 are planar, both the air bearing 226 and the air dam 230 are generally radially extending. In the broadest sense, such surfaces 218, 220, 222, and 224 of the present invention could be non-planar, such as being cone shaped, as can be appreciated by the artisan. The second air bearing and air dam surfaces 222 and 224 may be a monolithic portion of the stator 214 or may be portions of components attached directly or indirectly to the stator 214. In either case, the stator 214 is considered to have such surfaces 222 and 224.

In an exemplary construction, the first air bearing surface 218 is radially adjacent the protuberance 221, the protuberance 221 is radially adjacent the first air dam surface 220, and the first air bearing surface 218 extends closer to the axis 216 than does the second air bearing surface 222. It is preferred that the air bearing 226 is disposed radially outward of the air dam 230, and that the protuberance 221 is disposed radially between, and extends axially beyond, the second air bearing surface 222 and the second air dam surface 224. Preferably, ambient air 232 proximate and radially inward of the air dam 230 has a higher static pressure, and ambient air 234 proximate and radially outward of the air bearing 226 has a lower static pressure.

The second air bearing surface 222 has a surface hole 236, and the stator 214 has a first passageway 238 (shown in dashed line in FIG. 2). The first passageway 238 has a first outlet orifice which is defined by the surface hole 236 and has a first inlet orifice 240 which is in fluid communication with the ambient air 232 having the higher static pressure. The stator 214 has a second passageway 242 and preferably a third passageway 244 which is similar to the second passageway 242. The second passageway 242 has a second outlet orifice 246 which is in fluid communication with the ambient air 234 having the lower static pressure and has a second inlet orifice 248 which is in fluid communication with the ambient air 232 having the higher static pressure which has passed through the air dam 230 and around the protuberance 221. In a preferred construction, the stator 214 also has an aspirator tooth 250 extending axially across and radially inward of the air dam 230, wherein the aspirator tooth 250 has a tip 252 spaced apart from and proximate the rotor 212.

As can be appreciated by those skilled in the art, the rotor and stator assembly 110 and 210 of the present invention may be more broadly described as follows. The rotor and stator assembly 110 and 210 includes a rotor 112 and 212 having a generally longitudinally extending axis 116 and 216, a first air bearing surface 118 and 218, and a first air dam surface 120 and 220. The first air bearing surface 118 and 218 is generally annular and generally perpendicular to the axis 116 and 216. The first air dam surface 120 and 220 is generally annular and generally perpendicular to the axis 116 and 216.

The rotor and stator assembly 110 and 210 also includes a stator 114 and 214 having a second air bearing surface 122 and 222 and a second air dam surface 124 and 224. The second air bearing surface 122 and 222 is generally annular, generally perpendicular to the axis 116 and 216, and spaced apart from and proximate the first air bearing surface 118 and 218. The second air dam surface 124 and 224 is generally annular, generally perpendicular to the axis 116 and 216, and spaced apart from and proximate the first air dam surface 120 and 220. The first and second air bearing surfaces 118 & 218 and 122 & 222 generally oppose each other and define an air bearing 126 and 226 of an aspirating face seal 128 and 228. The first and second air dam surfaces 120 & 220 and 124 & 224 generally oppose each other and define an air dam 130 and 230 of the aspirating face seal 128 and 228. In an above-axis longitudinal cross-sectional view, the air bearing 126 and 226 has a first air flow direction and the air dam 130 and 230 has a second air flow direction which is generally parallel to the first air flow direction.

The rotor and stator assembly 110 and 210 further includes means for diverting, in a direction transverse to the first air flow direction, any air flow between the air bearing 126 and 226 and the air dam 130 and 230. When the first air flow direction is radial (as it would be in FIGS. 1 and 2), such means would divert such air flow in an axial direction. In the previously-discussed first preferred embodiment, such means would be the axially-offset first air dam surface 120. In the previously-discussed second preferred embodiment, such means would be the protuberance 221. Other such means include equipping the stator with an axially extending protuberance; injecting an axial stream of higher pressure air (or drawing a partial vacuum with lower pressure air) at the location of, and in place of, the protuberance; and the like; as can be appreciated by those skilled in the art. Such means ensures that air flow leaving the air dam 130 and 230 will have a greater tendency to exit via the second passageway 142 and 242 and the third passageway 144 and 244, permitting the aspirating face seal 128 and 228 to close properly. Without such means, air flow leaving the air dam 130 and 230 tends to enter the air bearing 126 and 226 resulting in increased pressure in the air bearing 126 and 226 and an inability of the aspirating face seal 128 and 228 to establish its equilibrium position within close proximity to the rotor 112 and 212.

An aspirating face seal typically has additional conventional parts, as is known to the artisan. Those additional conventional parts include, without limitation, one or more of the following: a primary face seal ring; a secondary piston ring; a radial garter ring; axial compression springs; a seal housing; and retraction coil springs. Such additional conventional parts have been omitted from the drawings for clarity, and are being omitted from further discussion, as such additional conventional parts form no part of the present invention.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A rotor and stator assembly comprising:
   a) a rotor having a generally longitudinally extending axis, a first air bearing surface, and a first air dam surface, wherein said first air bearing surface is generally annular, generally perpendicular to said axis, and generally planar, and wherein said first air dam surface is generally annular, generally perpendicular to said axis, generally planar, and radially proximate and axially offset from said first air bearing surface; and
   b) a stator having a second air bearing surface and a second air dam surface, wherein said second air bearing surface is generally annular, generally perpendicular to said axis, generally planar, and spaced apart from and proximate said first air bearing surface, wherein said second air dam surface is generally annular, generally perpendicular to said axis, generally planar, radially proximate and axially offset from said second air bearing, and spaced apart from and proximate said first air dam surface, wherein said first and second air bearing surfaces generally oppose each other and define an air bearing of an aspirating face seal, and wherein said first and second air dam surfaces generally oppose each other and define an air dam of said aspirating face seal.

2. The assembly of claim 1, wherein said first air bearing surface is radially adjacent said first air dam surface.

3. The assembly of claim 2, wherein said first air bearing surface extends closer to said axis than does said second air bearing surface.

4. The assembly of claim 3, wherein said air bearing is disposed radially outward of said air dam.

5. The assembly of claim 4, wherein said first air dam surface axially protrudes above said first air bearing surface.

6. The assembly of claim 5, wherein ambient air proximate and radially inward of said air dam has a higher static pressure and ambient air proximate and radially outward of said air bearing has a lower static pressure.

7. The assembly of claim 6, wherein said second air bearing surface has a surface hole, wherein said stator has a first passageway, wherein said first passageway has a first outlet orifice which is defined by said surface hole, and wherein said first passageway has a first inlet orifice which is in fluid communication with said ambient air having said higher static pressure.

8. The assembly of claim 7, wherein said stator has a second passageway, wherein said second passageway has a second outlet orifice which is in fluid communication with said ambient air having said lower static pressure, and wherein said second passageway has a second inlet orifice which is in fluid communication with said ambient air having said higher static pressure which has passed through said air dam.

9. The assembly of claim 8, wherein said stator also has an aspirator tooth extending axially across and radially inward of said air dam.

10. The assembly of claim 9, wherein said aspirator tooth has a tip spaced apart from and proximate said rotor.

11. A rotor and stator assembly comprising:
    a) a rotor having a generally longitudinally extending axis, a first air bearing surface, a first air dam surface, and a protuberance, wherein said first air bearing surface is generally annular, generally perpendicular to said axis, and generally planar, wherein said first air dam surface is generally annular, generally perpendicular to said axis, and generally planar, and wherein said protuberance is disposed radially between, and extends axially above, said first air bearing surface and said first air dam surface; and
    b) a stator having a second air bearing surface and a second air dam surface, wherein said second air bearing surface is generally annular, generally perpendicular to said axis, generally planar, and spaced apart from and proximate said first air bearing surface, wherein said second air dam surface is generally annular, generally perpendicular to said axis, generally planar, and spaced apart from and proximate said first air dam surface, wherein said first and second air bearing surfaces generally oppose each other and define an air bearing of an aspirating face seal, wherein said first and second air dam surfaces generally oppose each other and define an air dam of said aspirating face seal, and wherein said protuberance diverts but does not block flow from said air bearing and said air dam.

12. The assembly of claim 11, wherein first air bearing surface is radially adjacent said protuberance, and wherein said protuberance is radially adjacent said first air dam surface.

13. The assembly of claim 12, wherein said first air bearing surface extends closer to said axis than does said second air bearing surface.

14. The assembly of claim 13, wherein said air bearing is disposed radially outward of said air dam.

15. The assembly of claim 14, wherein ambient air proximate and radially inward of said air dam has a higher static pressure and ambient air proximate and radially outward of said air bearing has a lower static pressure.

16. The assembly of claim 15, wherein said second air bearing surface has a surface hole, wherein said stator has a first passageway, wherein said first passageway has a first outlet orifice which is defined by said surface hole, and wherein said first passageway has a first inlet orifice which is in fluid communication with said ambient air having said higher static pressure.

17. The assembly of claim 16, wherein said stator has a second passageway, wherein said second passageway has a second outlet orifice which is in fluid communication with said ambient air having said lower static pressure, and wherein said second passageway has a second inlet orifice which is in fluid communication with said ambient air having said higher static pressure which has passed through said air dam and around said protuberance.

18. The assembly of claim 17, wherein said stator also has an aspirator tooth extending axially across and radially inward of said air dam.

19. The assembly of claim 18, wherein said aspirator tooth has a tip spaced apart from and proximate said rotor.

\* \* \* \* \*